(12) United States Patent
Himmelmann

(10) Patent No.: US 8,342,290 B2
(45) Date of Patent: Jan. 1, 2013

(54) SELF CLEANING GREASE LUBRICATED SPLINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 343 days.

(21) Appl. No.: 12/489,971

(22) Filed: Jun. 23, 2009

(65) Prior Publication Data

US 2010/0320033 A1    Dec. 23, 2010

(51) Int. Cl.
*F16H 57/04*    (2010.01)

(52) U.S. Cl. .................................................. 184/6.12

(58) Field of Classification Search ............... 184/6.12, 184/14; 475/159; 180/339; 310/67 R
See application file for complete search history.

(56) References Cited

U.S. PATENT DOCUMENTS

| | | | |
|---|---|---|---|
| 2,749,191 A * | 6/1956 | Cole et al. ................ | 384/564 |
| 3,201,515 A | 8/1965 | Meisingset et al. | |
| 3,380,555 A | 4/1968 | Myers et al. | |
| 3,577,746 A * | 5/1971 | Dolan ..................... | 464/16 |
| 3,621,937 A | 11/1971 | Edge et al. | |
| 3,637,049 A * | 1/1972 | Butterfield et al. ........ | 184/6.12 |
| 3,785,458 A | 1/1974 | Caldwell et al. | |
| 3,847,248 A | 11/1974 | Avery | |
| 3,990,538 A * | 11/1976 | Casey et al. ............... | 184/109 |
| 4,026,386 A | 5/1977 | Therkildsen | |
| 4,281,942 A * | 8/1981 | Gaeckle et al. ........... | 403/38 |
| 4,589,533 A * | 5/1986 | Del Duca ................ | 192/18 A |
| 4,771,864 A * | 9/1988 | Lorimor et al. .......... | 184/6 |
| 4,810,126 A * | 3/1989 | Lengel .................... | 403/322.1 |
| 4,987,974 A | 1/1991 | Crouch | |
| 6,364,772 B1 | 4/2002 | Sugden | |
| 6,707,205 B2 | 3/2004 | Johnsen | |
| 7,389,712 B2 | 6/2008 | Himmelmann | |
| 7,472,547 B2 | 1/2009 | Grosskopf et al. | |
| 2009/0215569 A1 | 8/2009 | Shibukawa et al. | |
| 2010/0193296 A1* | 8/2010 | Sora ....................... | 184/14 |
| 2010/0320033 A1* | 12/2010 | Himmelmann .......... | 184/6.12 |
| 2011/0001400 A1* | 1/2011 | Chiba et al. ............. | 310/67 R |

FOREIGN PATENT DOCUMENTS

| | | |
|---|---|---|
| EP | 2213804 A1 | 8/2010 |
| GB | 2407361 A | 4/2005 |
| WO | WO2010061571 A1 | 6/2010 |

OTHER PUBLICATIONS

European Search Report for International Patent Application EP10251133, Nov. 11, 2010, 5 pages.

* cited by examiner

*Primary Examiner* — Michael Mansen
*Assistant Examiner* — Mark K Buse
(74) *Attorney, Agent, or Firm* — Cantor Colburn LLP

(57) ABSTRACT

A lubrication system for a spline interface (20) includes at least one debris chamber (46) located radially outboard of the spline interface (20) of a first rotating component (16) and a second rotating component (18). Wear debris (44) is urged from the spline interface (20) toward the at least one debris chamber (46) by rotation of the first and second rotating components (16, 18) about a central axis (14). At least one lubricant reservoir (36) contains a volume of lubricant (40), wherein at least a portion of the volume of lubricant (40) flows toward the spline interface (20) in response to the wear debris (44) being urged from the spline interface (20) toward the at least one debris chamber (46).

18 Claims, 2 Drawing Sheets

SELF CLEANING GREASE LUBRICATED SPLINE

BACKGROUND OF THE INVENTION

The subject matter disclosed herein relates to rotary machines. More specifically, the subject matter relates to spline connections in rotary machines.

Connections between rotating components of machines or between machines is often accomplished via a spline connection. The spline connection includes male teeth on a first component which mesh with complimentary teeth on a second component. The spline connection allows rotational energy of the first component to be effectively transferred to the second component. During the life of the spline, particulate from, for example, wear of the spline teeth is generated and must be removed from the spline to ensure continued operation of the spline connection. Typically, a pressurized lubrication system is utilized which injects lubricant, for example, oil into the spline connection via an external pump to wash any accumulated particulate away. The oil is then typically disposed of external to the machine. Pressurized wash through lubrication systems of this type add significant cost and complexity to the rotary machine.

BRIEF DESCRIPTION OF THE INVENTION

According to one aspect of the invention, a lubrication system for a spline interface includes at least one debris chamber located radially outboard of a spline interface of a first rotating component and a second rotating component. Wear debris is urged from the spline interface toward the at least one debris chamber by rotation of the first and second rotating components about a central axis. At least one lubricant reservoir contains a volume of lubricant, wherein at least a portion of the volume of lubricant flows toward the spline interface in response to the wear debris being urged from the spline interface toward the at least one debris chamber.

According to another aspect of the invention, a rotary machine includes a first rotating component and a second rotating component operably connected to the first rotating component via a spline interface. At least one debris chamber is located radially outboard of the spline interface, wherein wear debris is urged from the spline interface toward the at least one debris chamber by rotation of the first and second rotating components about a central axis. At least one lubricant reservoir contains a volume of lubricant, wherein at least a portion of the volume of lubricant flows toward the spline interface in response to the wear debris being urged from the spline interface toward the at least one debris chamber.

According to yet another aspect of the invention, a method for lubricating a spline interface includes locating at least one debris chamber radially outboard of a spline interface of a first rotating component and a second rotating component and rotating the first rotating component and the second rotating component about a central axis. Wear debris is urged from the spline interface toward at least one debris chamber located radially outboard from the spline interface via rotation of the first and second rotating components. A volume of lubricant is flowed from a lubricant reservoir toward the spline interface in response to the wear debris being urged from the spline interface toward the at least one debris chamber.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
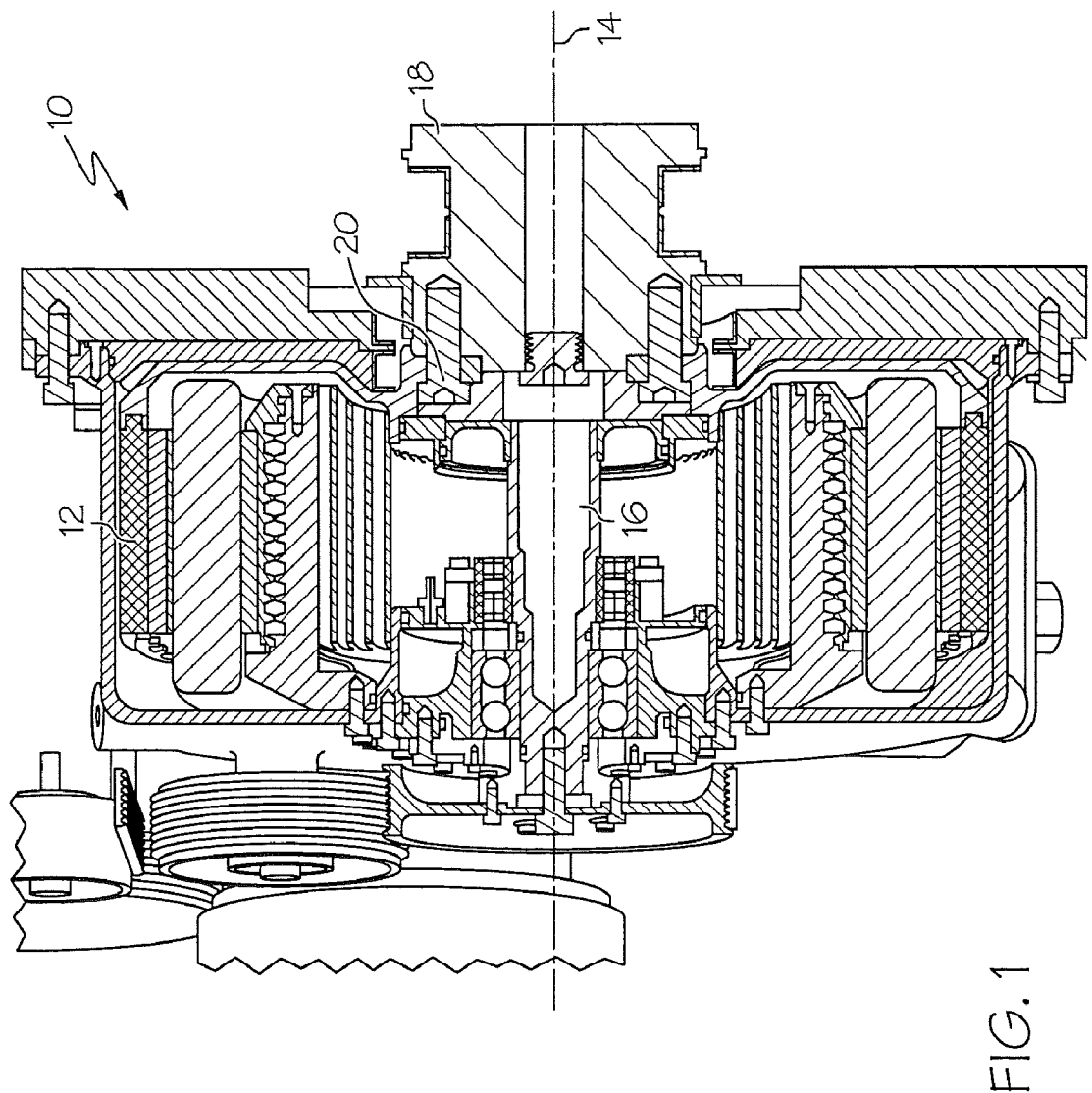
FIG. 1 is a cross-sectional view of an embodiment of a rotary machine.

Shown in FIG. 1 is a cross-section of a rotary machine, in this case a generator 10.

Figure 2:
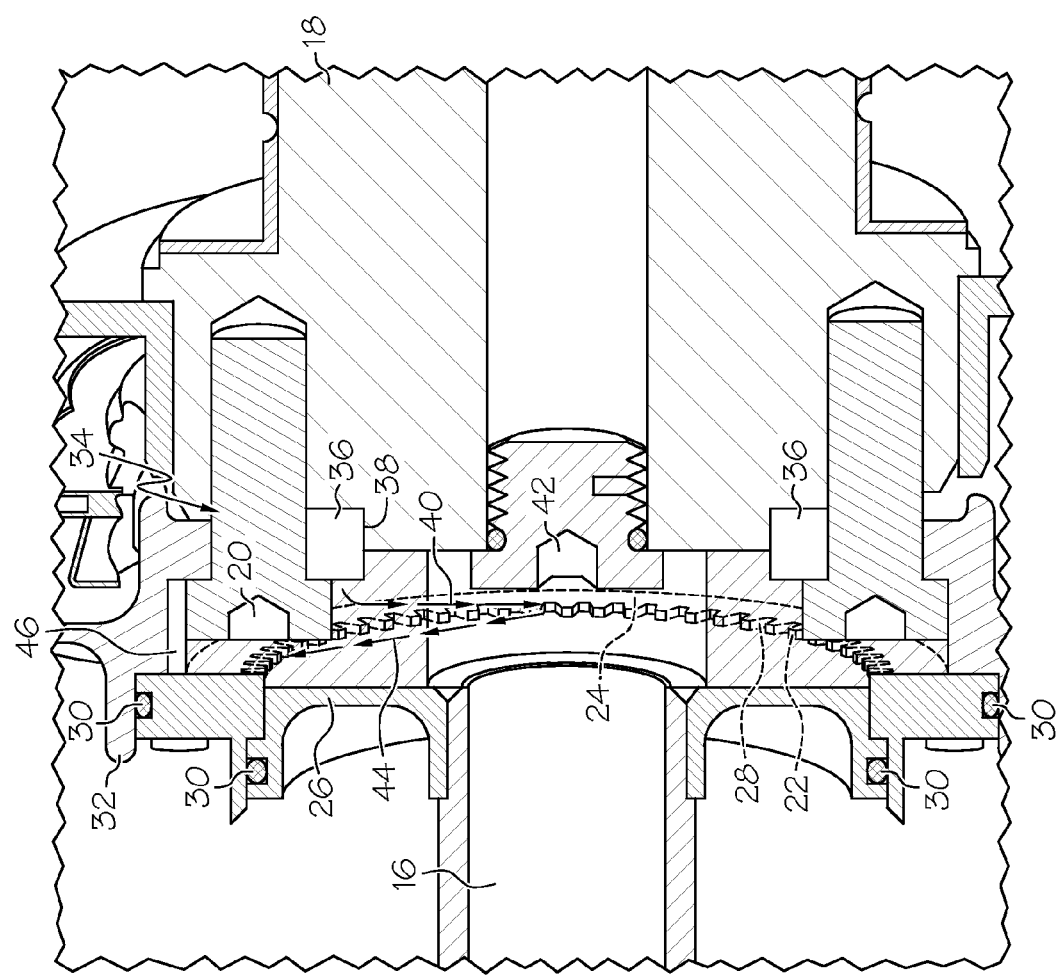
FIG. 2 is a cross-sectional view of an embodiment of a spline interface in a rotary machine.

The generator 10 includes at least one rotor 12 rotatable about a central axis 14. The generator 10 includes a generator shaft 16 disposed at the central axis 14 and connected to, for example, an engine crank shaft 18 via one or more spline interfaces 20. Referring now to FIG. 2, in some embodiments, the spline interface 20 is defined by a plurality of generator shaft teeth 22 which mesh with a complimentary plurality of crank shaft teeth 24.

In some embodiments, as shown in FIG. 2, the plurality of generator shaft teeth 22 extend radially inwardly from an inner surface of a substantially annular generator shaft plate 26, which, in some embodiments, is secured to the generator shaft 16 by welding or other means. Likewise, in some embodiments, the plurality of crank shaft teeth 24 are disposed at a crank shaft plate 28 and extend radially outwardly therefrom. The crank shaft plate 28 may be secured to the crank shaft 18 by welding or other like means. The configuration shown FIG. 2, however, is intended to be merely exemplary. For example, in some embodiments the plurality of generator shaft teeth 22 extend radially outwardly while the plurality of crank shaft teeth 24 extend substantially radially inwardly. In other embodiments, the generator shaft teeth 22 may extend substantially axially and mesh with the crank shaft teeth 24 which extend substantially axially toward the generator shaft teeth 22. Further, in some embodiments, the generator shaft plate 26 may be formed integral to the generator shaft 16 and/or the crank shaft plate 28 may be formed integral to the crank shaft 18.

One or more seal rings 30 are disposed, for example, between the generator shaft plate 26 and the crank shaft plate 28 and/or between the generator shaft plate 26 and a housing 32 to form a pressure vessel 34 around the spline interface 20. A fresh lubricant reservoir 36 is disposed in the pressure vessel 34 at, for example, and outer diameter 38 of the generator shaft 16. The fresh lubricant reservoir 36 is filled with a volume of lubricant 40, for example, an oil or grease. The lubricant 40 flows from the fresh lubricant reservoir 36 toward a lubrication chamber 42 disposed at the spline interface 20 of the plurality of generator shaft teeth 22 and the plurality of crank shaft teeth 24. As the generator 10 operates, metal particulate 44 is generated by wear of the plurality of generator shaft teeth 22 and the plurality of crank shaft teeth 24 and mixes with the lubricant 40 at the lubrication chamber 42. Since, however, a density of each particle of particulate 44 is greater than that of the lubricant 40, the particulate is centrifuged radially outwardly from the lubrication chamber 42 toward a debris chamber 46. The debris chamber 46 is disposed in the pressure vessel 34 at a location, for example, between the generator shaft plate 26 and the housing 32 and, in some embodiments, is disposed radially outboard of the fresh lubricant reservoir 36. The particulate 44 accumulates in the debris chamber 46. As the particulate 44 moves radially outwardly, voids are left in the lubricant chamber 42 by the moving particulate 44. The voids are filled by fresh lubricant 40 flowing from the fresh lubricant reservoir 36 toward the lubrication chamber 42.

Utilizing the rotation of the generator shaft 16 and the crank shaft 18 to urge flow of the lubricant 40 and the particulate 44 efficiently removes particulate from the spline interface 20 and lubricates the spline interface 20 without an additional external lubrication system thus reducing cost and complexity of the generator 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary machine comprising:
   a first rotating component;
   a second rotating component operably connected to the first rotating component via a spline interface, the spline interface defining an interface plane perpendicular to a central axis;
   at least one debris chamber disposed radially outboard of the spline interface, wherein wear debris is urged from the spline interface toward the at least one debris chamber by rotation of the first and second rotating components about a central axis; and
   at least one lubricant reservoir containing a volume of lubricant, wherein at least a portion of the volume of lubricant flows toward the spline interface in response to the wear debris being urged from the spline interface toward the at least one debris chamber, the at least one lubricant reservoir disposed at a same axial side of the interface plane as the at least one debris chamber.

2. The rotary machine of claim 1 comprising a pressure vessel defined around the spline interface.

3. The rotary machine of claim 2 wherein one or more seal rings are disposed to define the pressure vessel around the spline interface.

4. The rotary machine of claim 1 wherein the spline interface comprises a plurality of first spline teeth extending from the first rotating component which interlock with a plurality of second spline teeth extending from the second rotating component.

5. The rotary machine of claim 4 wherein the plurality of first spline teeth extend from a first spline plate secured to the first rotating component.

6. The rotary machine of claim 5 wherein the first spline plate is secured to the first rotating component via welding.

7. The rotary machine of claim 1 wherein the rotary machine is a generator.

8. The rotary machine of claim 7 wherein the first rotating component is a generator shaft.

9. The rotary machine of claim 7 wherein the second rotating component is an engine crank shaft.

10. A lubrication system for a spline interface comprising:
    at least one debris chamber disposed radially outboard of a spline interface of a first rotating component and a second rotating component, the spline interface defining an interface plane perpendicular to a central axis, wherein wear debris is urged from the spline interface toward the at least one debris chamber by rotation of the first and second rotating components about a central axis; and
    at least one lubricant reservoir containing a volume of lubricant, wherein at least a portion of the volume of lubricant flows toward the spline interface in response to the wear debris being urged from the spline interface toward the at least one debris chamber, the at least one lubricant reservoir disposed at a same axial side of the interface plane as the at least one debris chamber.

11. The lubrication system of claim 10 comprising a pressure vessel defined around the spline interface.

12. The lubrication system of claim 11 wherein one or more seal rings are disposed to define the pressure vessel around the spline interface.

13. A method for lubricating a spline interface comprising:
    disposing at least one debris chamber radially outboard of the spline interface of a first rotating component and a second rotating component, the spline interface defining an interface plane perpendicular to a central axis;
    rotating the first rotating component and the second rotating component about a central axis;
    urging wear debris from the spline interface toward at least one debris chamber disposed radially outboard from the spline interface via rotation of the first and second rotating components;
    flowing a volume of lubricant from a lubricant reservoir toward the spline interface in response to the wear debris being urged from the spline interface toward the at least one debris chamber, the lubricant reservoir located at a same axial side of the interface plane as the at least one debris chamber.

14. The method of claim 13 comprising defining a pressure vessel around the spline interface.

15. The method of claim 14 wherein the pressure vessel is at least partially defined by one or more seal rings.

16. The method of claim 13 wherein the spline interface comprises a plurality of first spline teeth extending from the first rotating component which interlock with a plurality of second spline teeth extending from the second rotating component.

17. The method of claim 16 wherein the plurality of first spline teeth (extend from a first spline plate secured to the first rotating component.

18. The method of claim 17 wherein the first spline plate is secured to the first rotating component via welding.

* * * * *